US012654574B2

(12) United States Patent
Wendschuh

(10) Patent No.: US 12,654,574 B2
(45) Date of Patent: Jun. 16, 2026

(54) INDUCTIVE COIL

(71) Applicant: InductEV, Inc., King of Prussia, PA (US)

(72) Inventor: Joren Kristofer Wendschuh, Paoli, PA (US)

(*) Notice: Subject to any disclaimer, the term of this patent is extended or adjusted under 35 U.S.C. 154(b) by 750 days.

(21) Appl. No.: 18/078,824

(22) Filed: Dec. 9, 2022

(65) Prior Publication Data

US 2024/0190272 A1 Jun. 13, 2024

(51) Int. Cl.
*H01B 5/08* (2006.01)
*B60L 53/12* (2019.01)
*H01F 37/00* (2006.01)

(52) U.S. Cl.
CPC ............... *B60L 53/12* (2019.02); *H01B 5/08* (2013.01); *H01F 37/005* (2013.01)

(58) Field of Classification Search
CPC .. H01B 5/08; H01B 5/12; H01B 9/027; H01F 37/005; H01F 2027/2838; H01F 27/2823; H01F 27/2871; H01F 38/14; H01F 41/07; B21B 1/166; B60L 53/12
See application file for complete search history.

(56) References Cited

U.S. PATENT DOCUMENTS 4,864,266 A * 9/1989 Feather ................. H01F 27/323
174/114 R
2018/0086211 A1 3/2018 Samuelsson et al.

2019/0304659 A1 10/2019 Tonogai et al.
2020/0312531 A1 10/2020 Okuizumi
2024/0260846 A1 * 8/2024 Gaul ..................... A61B 5/036

FOREIGN PATENT DOCUMENTS

JP 2008060432 A 3/2008

OTHER PUBLICATIONS

International Search Report and Written Opinion received in Patent Cooperation Treaty Application No. PCT/US24/11124, dated May 6, 2024.

* cited by examiner

*Primary Examiner* — Roshn K Varghese
(74) *Attorney, Agent, or Firm* — PEARL COHEN ZEDEK LATZER BARATZ LLP

(57) ABSTRACT

A coil assembly for a wireless power transfer (WPT) system includes a coil carrier tray constructed of a non-conductive, magnetically transparent material that has channels formed therein for receiving a coil. The coil includes a plurality of uninsulated rectangular Litz wire bundles that are woven, braided, or twisted together and then rolled or compressed into a rectangular shape and coated with a non-insulating thin film coating. Each Litz wire bundle, in turn, includes a plurality of uninsulated Litz wire sub-bundles that are woven, braided, or twisted together and then rolled or compressed into a rectangular shape. Each Litz wire sub-bundle, in turn, includes insulated Litz wire strands that are woven, braided, or twisted together and then rolled or compressed into a rectangular shape. The coil design maximizes the amount of conductive material in the channels, maximizing flux density while creating a uniform magnetic flux at the coil surface.

20 Claims, 4 Drawing Sheets

Prior Art
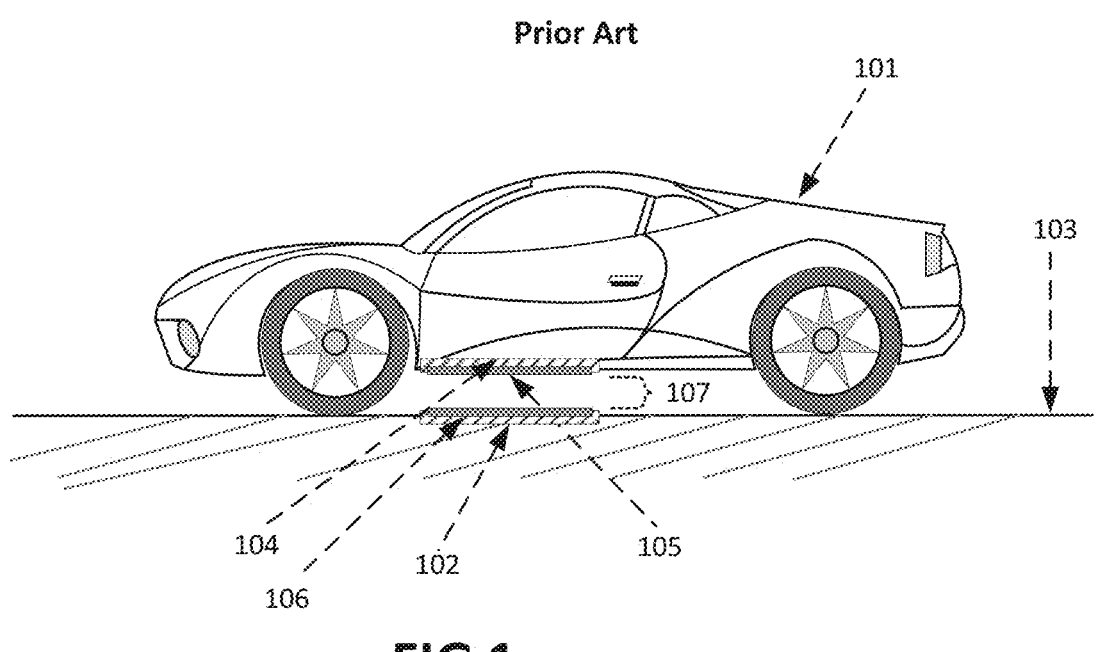
FIG 1
Prior Art
Prior Art
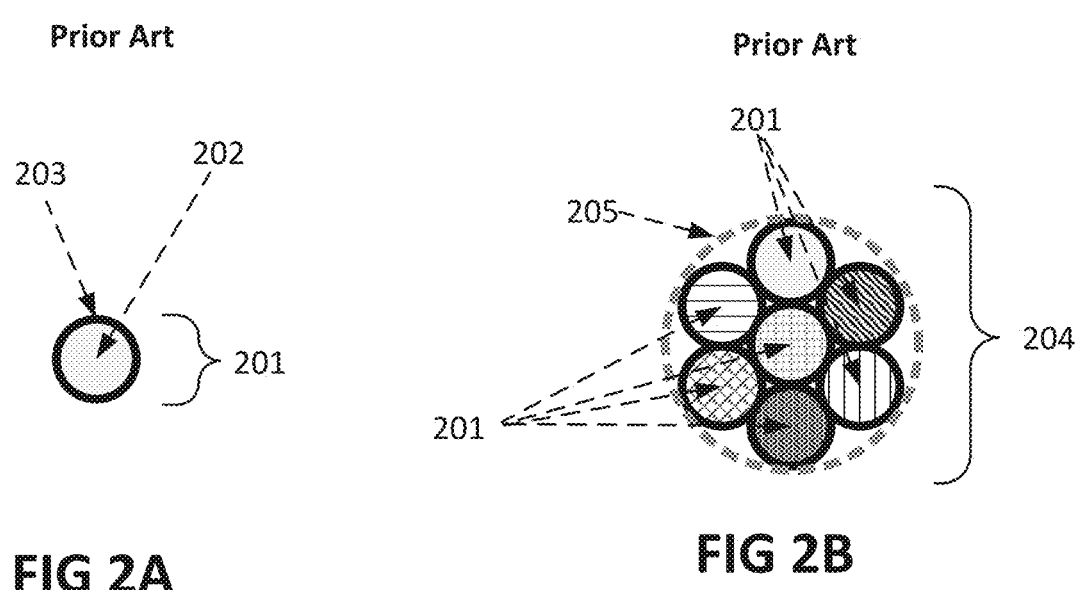
FIG 2A
FIG 2B

INDUCTIVE COIL

TECHNICAL FIELD

The present disclosure relates generally to wireless power transfer, and more specifically to devices, systems, and methods related to wireless power transfer to remote systems such as vehicles including batteries. More particularly, the present disclosure relates to the construction of primary and secondary induction coils in a wireless power transfer system.

BACKGROUND

Resonant induction wireless charging makes use of an air core transformer consisting of two concentric coils displaced along a common coil axis. Electrical power is sent from the sending apparatus (i.e., the primary or transmission coil) to the receiving apparatus (i.e., the secondary or receiver coil) by means of magnetic flux linkage between the two transfer coils. An alternating current flowing in the primary coil induces an alternating current into the secondary coil.

One option for constructing coils is use of Litzendraht (aka Litz) wire or other conductive filaments. Litz wire consists of bundles of individually insulated conductive strands. The individual strands are then twisted, woven, or braided into the bundle using a uniform pattern. The weave or braided pattern of a Litz wire works to counter the proximity effect, with strands being placed so that the current load is as evenly distributed as possible. Several bundles then can be twisted, or braided, together to form larger diameter Litz wires. Sample Litz wire types include, for example, Round types 1-6 and Rectangular types 7 and 8 available from New England Wire Technologies. By using small diameter strands (thinner than skin-depth) a reduction of AC losses due to resistance is realized. The low impedance Litz wire is also useful for transmitting low frequency (below 1 MHz) high voltage, high amplitude current between the circuit components such as an inverter and a primary coil assembly.

Because of low electrical losses and ease of soldering, the Litz wire is often manufactured with outer insulating coating of polyurethane or polyurethane top coated with nylon. Interior Litz wire bundles are often insulated with an overall single or double wrap or served using textile or film ribbons for abrasion resistance and space factor in the winding.

Alternately, as described in U.S. Patent Application US 2018/035060, entitled "WIRELESS POWER TRANSFER THIN PROFILE COIL ASSEMBLY," the magnetic induction coil conductors can be comprised of multiple conductive traces layered into an insulative, dielectric substrate (e.g., a printed circuit board).

Potting of an electronic assembly is a process of filling the assembly with an electrically insulative liquid compound which then hardens or cures. The hardened material results (for high voltage assemblies such as a high-power inductive WPT coil assembly) in prevention of arcing and increased resistance to loading, shocking and vibration. The chemically inert potting material also excludes liquids (e.g., water, solvents) from entering the assembly. Introduction of potting compounds is commonly done under vacuum to retard the formation of voids or bubbles by preventing or removing when formed. However, the introduction of potting compounds when forming conventional Litz wire coils may distend the Litz wire bundles or distort the pattern of individual strands, causing the Litz wire bundles to be non-uniform, leading to generation of non-uniform magnetic fields and hot spots, with localized impedance changes and resistance nonuniformities under load.

SUMMARY

Various examples are now described to introduce a selection of concepts in a simplified form that are further described below in the Detailed Description. The Summary is not intended to be used to limit the scope of the claimed subject matter.

In sample configurations, a coil assembly for a wireless power transfer (WPT) system is provided that includes a coil carrier tray constructed of a non-conductive, magnetically transparent material and having channels formed therein and an inductive coil disposed in at least two of the channels. The coil comprises a plurality of uninsulated rectangular Litz wire bundles that are woven, braided, or twisted together and then rolled or compressed into a rectangular shape and coated with a non-insulating thin film coating. Each Litz wire bundle, in turn, comprises a plurality of uninsulated Litz wire sub-bundles that are woven, braided, or twisted together and then rolled or compressed into a rectangular shape. Each Litz wire sub-bundle includes insulated Litz wire strands that are woven, braided, or twisted together and rolled or compressed into a rectangular shape.

In the sample configurations, the coil carrier tray is comprised of fiberglass or a ceramic. The coil carrier tray further comprises a lid and a center post that bears the weight of the lid and a vehicle, pedestrian, or other loading on the coil carrier tray.

In the sample configurations, the Litz wire bundles are woven, braided, or twisted together and then rolled or compressed to create a uniform pattern whereby each Litz wire bundle is substantially uniformly exposed to an outer surface of the coil. The plurality of uninsulated rectangular Litz wire bundles are further shaped and sized to fit into a channel of the coil carrier tray. Also, the thin film coating is configured to withstand vacuum potting whereby potting material and air are prevented from accessing the Litz wire bundles during a vacuum potting process.

In the sample configurations, the plurality of uninsulated rectangular Litz wire bundles may be served on a cable spool and cut to length. In such cases, each insulated Litz wire strand in a sub-bundle may be color-coded to differentiate each insulated Litz wire strand at either end of a cut length of a Litz wire bundle. Alternatively, the coil may have a predetermined length where each Litz wire bundle is terminated in a solder tail or attachment terminal.

The description also includes a method of manufacturing an induction coil for a wireless power transfer (WPT) system. The method includes weaving, braiding, or twisting together a plurality of insulated Litz wire strands into a plurality of uninsulated Litz wire sub-bundles and then rolling or compressing each Litz wire sub-bundle into respective rectangular shapes. Each Litz wire sub-bundle is woven, braided, or twisted together into a plurality of uninsulated Litz wire bundles and each Litz wire bundle is then rolled or compressed into respective rectangular shapes. Each Litz wire bundle is woven, braided, or twisted together into a Litz wire cable and the Litz wire cable is then rolled or compressed into a rectangular shape. The Litz wire cable is with a non-insulating thin film coating and inserted into respective channels of a coil carrier tray constructed of a non-conductive, magnetically transparent material.

In sample methodologies, weaving, braiding, or twisting together each Litz wire bundle into a Litz wire cable and then rolling or compressing the Litz wire cable into a rectangular shape may include rolling or compressing the Litz wire cable into a rectangular shape having a uniform pattern whereby each Litz wire bundle is substantially uniformly exposed to an outer surface of the induction coil. Coating the Litz wire cable with a thin film coating also may include coating the Litz wire with the thin film coating so as to withstand vacuum potting whereby potting material and air are prevented from accessing the Litz wire bundles during a vacuum potting process. Inserting the Litz wire cable into respective channels of the coil carrier tray may include adapting the Litz wire cable to substantially conform to a shape of a channel of the coil carrier tray.

The disclosed methods may further include color-coding each insulated Litz wire strand in a sub-bundle, serving the plurality of uninsulated rectangular Litz wire bundles on a cable spool, and cutting the uninsulated rectangular Litz wire bundles to length, where each insulated Litz wire strand in a sub-bundle is differentiated at either end of a cut length of a Litz wire bundle by the respective colors. The Litz wire cable may be cut to a predetermined length and each Litz wire bundle terminated in a solder tail or attachment terminal.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the embodiments described in the Detailed Description below.

BRIEF DESCRIPTION OF THE DRAWINGS

The foregoing and other beneficial features and advantages of the invention will become apparent from the following detailed description in connection with the attached figures, of which:

FIG. 1 is a diagram illustrating a Wireless Power Transfer (WPT) system in a conventional electric vehicle charging application.

FIG. 2A is a diagram showing, in cross-section, a single strand of a conventional Litz wire.

FIG. 2B is a diagram showing, in cross-section, an exemplary bundle of conventional round type 1 Litz wires.

4

DETAILED DESCRIPTION

Figures 3, 4, 5, 6:
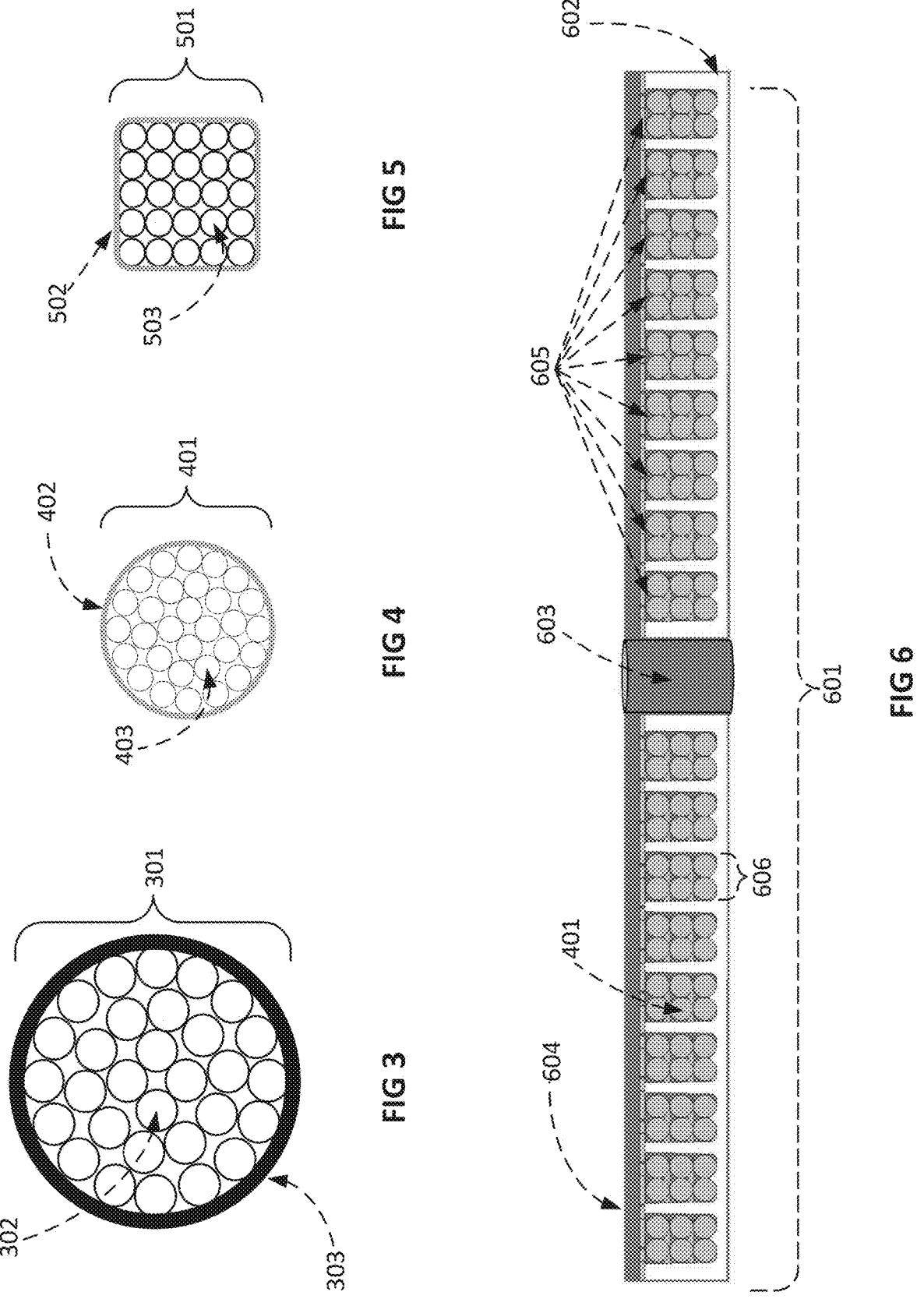
FIG. 3 is a diagram showing, in cross-section, a large round type 3 Litz wire with electrical insulation cover.
FIG. 4 is a diagram showing, in cross-section, a small radius round type 3 Litz wire
FIG. 5 is a diagram showing, in cross-section, a rectangular Litz wire bundle compressed into a rectangular profile.
FIG. 6 is a diagram of a side view of an exemplary Litz wire coil and bisected carrier tray assembly.

A detailed description of illustrative embodiments will now be described with reference to FIGS. 1-11. Although this description provides a detailed description of possible implementations, it should be noted that these details are intended to be exemplary and in no way delimit the scope of the inventive subject matter.

Litz wire commonly is constructed in 8 types with both the number of strands and gauge of conductive strands (e.g., copper, aluminum, silver, gold, graphene) selectable. Coverings can include textile yarn, film ribbon, or insulative casings of various thicknesses, materials, and dielectric ratings. Coverings can be placed around a bundle, or a group of bundles, with every Litz strand in a bundle always insulated with lacquer or film.

Served Litz bundles are covered with un-insulative materials (nominally silk, polyester, or nylon textiles) for dimensional stability and mechanical protection.

FIG. 1

FIG. 1 is a diagram illustrating a side view of a Wireless Power Transfer (WPT) system in a conventional electric vehicle charging application. The Electric Vehicle (EV) 101 is in place over the ground charger assembly 102 for charging. In this example, the ground charger assembly (GCA) 102 is flush with the pavement 103. The vehicle receiver assembly (VRA) 104 is aligned over the GCA 102. The GCA 102 and VRA 104 are separated by the Z-Gap distance 107, across which energy passes in the form of magnetic flux.

During charging, the magnetic flux from GCA 102 is received by the vehicle coil 105 of the VRA 104. The magnet flux is generated by powering the ground coil 106 of the GCA 102 with alternating current (AC).

FIG. 2A

FIG. 2A is a diagram showing, in cross-section, a single strand of a conventional Litz wire. As illustrated, the Litz wire strand 201 consists of a conductive material (e.g., copper) in the form of a wire strand 202 whose diameter is preferably less than the skin effect depth at the operating frequency of the magnetic coil. The wire strand 202 is clad in a covering 203 of insulative film or lacquer. The insulation of the strand is determined by the voltage needs of the application in which the Litz wire strand 201 will be used.

FIG. 2B

FIG. 2B is a diagram showing, in cross-section, an exemplary bundle 204 of conventional round type 1 Litz wires 201. In this example, seven multiple twisted, braided, or woven insulated Litz strands 201, are shown. The covering 205 may be insulative or non-insulative. If insulated, the insulation is designed to withstand the voltage stresses the cable will experience over its expected service lifetime. The insulation level (e.g., 100%, 133%, 173%) for a cable results in various insulation thicknesses within a single voltage rating as defined, for example, in the National Fire Protection Association (NFPA) 70—National Electrical Code (NEC) 2020 Section 211:10(c) among other publications.

FIG. 3

FIG. 3 is a diagram showing, in cross-section, a large round type 3 Litz wire 301 with electrical insulation cover as used in an early generation WPT system. The Litz wire 301 consists of thirty Litz bundles 302 in an insulating casing 303. The Litz bundles 302 may be braided, twisted or woven into the cable 301 with the bundles 302 themselves also braided, twisted, or woven from sub-bundles or Litz wire strands. The braiding, twisting, or interweaving of strands attempts to average the encounters of each strand of each bundle 302 with magnetic flux lines by uniformly bringing each strand to the insulation casing 303 so that each strand will develop the same amount of current over a length. The Litz wire 301 behaves like normal Litz wire type 1 in its ability to minimize losses from skin effect and proximity effect when transmitting magnetically generated current.

FIG. 4

FIG. 4 is a diagram showing, in cross-section, a smaller radius round type 3 Litz wire 401 as used in a second generation WPT system (as shown in coil 605 of the coil tray 601 of FIG. 6). The Litz wire 401 consists of thirty bundles 403 of Litz wire. The Litz wire strands within each bundle 403 are twisted as are the bundles 403 themselves in this example. The Litz wire 401, in this example, is served whereby the outer surface is wrapped within a covering 402 (e.g., textile yarn, tape, or film ribbon) that surrounds the Litz wire 401 without providing additional, rated insulation.

In the example coil tray 601 shown in FIG. 6, it is noted that six of the smaller Litz wires 601 were placed into each channel 606 of the tray 601.

FIG. 5

FIG. 5 is a diagram showing, in cross-section, a rectangular Litz wire bundle 501 (similar to a type 8 Litz wire) compressed into a rectangular profile. Each bundle 501 is served with a non-insulative coating 502. As with the circular Litz shown in FIG. 3 and FIG. 4, the Litz bundle 501 is braided, twisted, or woven so that each strand 503 is uniformly brought to the surface of the Litz bundle 501, just under the serving coating 502 (e.g., textile yarn, tape, or extruded compounds) so that each strand 503 will develop the same amount of current over a length. The Litz wire bundle 501 also behaves like normal Litz wire type 8 in its ability to minimize losses from skin effect and proximity effect while carrying the supplied (if used as a primary coil) or generated (if used as the secondary coil) AC current.

FIG. 6

FIG. 6 is a diagram of a side view of an exemplary Litz wire coil and bisected carrier tray assembly 601 for use as the primary coil of a GCA or secondary coil of a VRA. It is noted that the primary coil may include the carrier tray assembly 601 while the secondary coil may include the afore-mentioned thin profile coil assembly as described in U.S. Patent Application US 2018/035060. The coil tray body 602 may be constructed of a non-conductive, magnetically transparent material such as a composite material (e.g., fiberglass), plastic, or ceramic. In this example, a center post 603 helps bear the weight of the lid 604 and any vehicle, pedestrian, or other temporary loading.

In this example, the coil 605 includes nine turns in defined channels 606, with six insulated Litz wires 401 of the type described with respect to FIG. 4, per turn. In this example, since the six Litz wires 401 are joined at the ends, the coil 605 remains a nine-turn coil, but other constructions where each Litz wire 401 is fed by a separate DC-to-AC inverter can be constructed.

In addition to the generation and capture of magnetic flux needed for inductive wireless transfer, the six Litz wires 401 serve to conduct heat generated from the impedance (resistance and reactance) inherent in the coil wiring 605. The generated heat is transferred to the coil wire connectors (not shown), the lid 604, and (via the walls and floors of the channels 606) to the coil tray body 602 and center post 603.

FIG. 7

Figures 7, 8, 9:
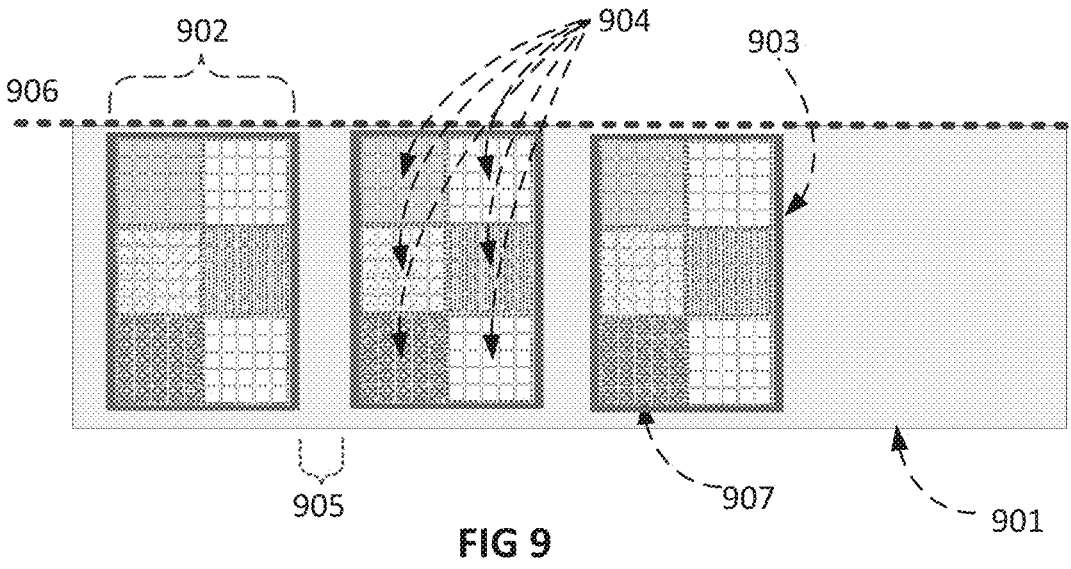
FIG. 7 is a diagram showing, in partial cross-section, an early realization of a ground coil tray with three channels each with a Litz wire coil winding in a sample configuration.
FIG. 8 is a diagram showing, in partial cross-section, an 85 kHz band ground coil tray in a sample configuration.
FIG. 9 is a diagram showing, in cross-section, an evolved 85 kHz band ground coil in a sample configuration.

FIG. 7 is a diagram showing, in partial cross-section, an early realization of a ground coil tray 701 with three channels 702 each with a Litz wire coil winding 703. Each channel 702 is separated by a divider 704 which serves to position the Litz wire coil windings 703 and to bear weight from the lid (not shown) resting on the top 705 of the ground coil tray 701. Due to the circular nature of this Litz wire 703, potting material 706 is used to fill the gaps between the Litz wire coil windings 703 and each of the ground coil tray channels 702.

The mismatch in cross-section of the channels 702 to the cross-section of the Litz wire coil windings 703 as well as the thick insulation 707 needed to insulate the Litz wire coil windings 703 reduces the volume of copper that can be used in the first-generation coil of FIG. 7.

FIG. 8

FIG. 8 is a diagram showing, in partial cross-section, an 85 kHz band ground coil tray 801 in a sample configuration. In this design, six Litz wire cables 802 are placed in each of the three channels 803 shown. Each channel 803 is separated by a wall 804 of tray material which serves to position the Litz wire cables 802 and to bear weight from the lid (not shown) resting on the top 805 of the ground coil tray 801.

The six Litz wire cables design of FIG. 8 has proven to be easier to manufacture than the coil shown in FIG. 7. However, the six Litz wire cable design of FIG. 8 introduced new issues in uneven heat generation and distribution as a result of distention and distortion of the Litz wire cables 802 under vacuum potting.

The Litz wire cables 802 may experience distention under vacuum potting when trapped air inside the Litz wire cables 802 expand and cause the insulation to bulge, resulting in misalignments both in between the Litz wire cables 802 and between the individual strands of the respective Litz wire cables 802 made permanent by the introduction of the potting material 806 into the channels 803 which fills the voids in-between the cables 802 and in between the cables 802 and channel walls 804. The non-uniformities introduced by the vacuum potting process and then set by the hardened potting material increases the Litz wire losses due to the proximity effect.

FIG. 9

FIG. 9 is a diagram showing, in cross-section, an evolved 85 KHz band ground coil in a sample configuration. The Litz coil design shown in FIG. 9 minimizes the issues of vacuum potting distention (a.k.a. bird-caging) which would otherwise cause uneven heat generation and heat distribution in the Litz coil as described above with respect to the designs of FIG. 7 and FIG. 8.

As illustrated in FIG. 9, the volume of wire in the coil tray 901 channels 902 can be maximized using a Litz cable 903 that is rectangular in cross-section, comprised of similarly rectangular bundles 904 of Litz wire which are each coated with a non-insulative film. The Litz cable 903 relies on the insulation of the individual Litz strands. Each Litz bundle 904 is braided, twisted, or woven from individual strands with the resultant bundles then twisted, braided, or woven together before compression to form the rectangular Litz cable 903. Each channel 902 is separated by a wall 905 of tray material which serves to position the Litz cables 903 and to bear weight from the lid (not shown) resting on the top 906 of the coil tray 901.

The advantage of a served Litz cable is lesser insulation weight, reduced volume (versus insulated), and lessened thermally insulative covering thickness. A served cable also allows for easier bending/flexibility in final assembly of the inductive coil. On the other hand, the advantage of insulated (or just covered) Litz cable 903 is the mechanical restraint of bundles and strands by holding constant of the compression and forming done prior to application of the covering material (consider this the mechanical equivalent of binding a cable bundle with lacing tape or string so as not to allow expansion).

The modified Litz cable 903 uses a continuous film sleeve 907 in place of a rated insulative cover or coating. The individual rectangular bundles 904 that comprise the modified Litz cable 903 are not covered, coated, or served to decrease total bundle cross-sectional volume and increase heat transfer between bundles 904. The individual strands that comprise the bundles 904 are insulated from each other by a coating (lacquer or film). During fabrication, the compression and forming/shaping minimizes airgaps between the individual strands of the bundles 904. The film sleeve 907 over the Litz cable 903 maintains the compression developed during fabrication and sustains compression during the vacuum potting.

FIG. 10

Figure 10:
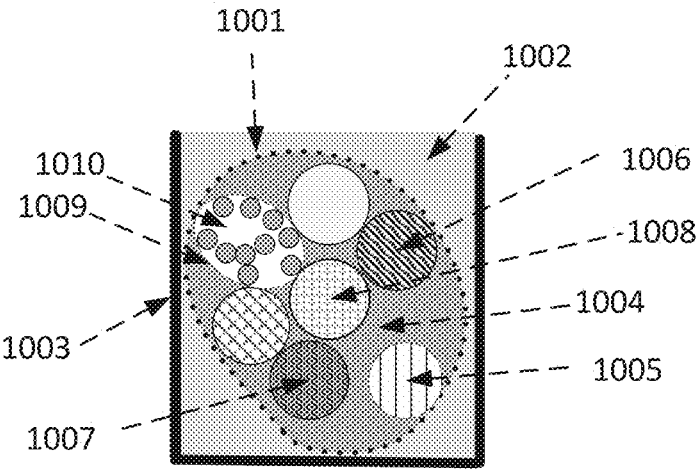
FIG. 10 is a diagram showing an example of "bird caging" distention and distortion of served Litz wire as a result of vacuum potting.

FIG. 10 is a diagram showing an example of "bird caging" distention and distortion of served Litz wire as a result of vacuum potting. In FIG. 10, the Litz cable 1001 is served (wrapped) with conventional materials (textile yarn, film ribbon) and then vacuum potted. The potting material 1004 fills the volume 1002 between the cable tray 1003 and the cable 1001. As indicated, the vacuum potting process also causes deformation of the compacted cable assembly which will not rebound. This allows some potting material 1004 to infiltrate the Litz cable 1001 through the porous or penetrable serving material. All potting compounds shrink (nominally 1-4% by volume) when they change from the liquid to the solid state with a chemical reaction (i.e., curing) but not sufficiently to overcome the deformation of the compacted cable assembly, resulting in displaced Litz wire bundles 1005 leaving gaps between the Litz wire bundles 1006, 1007, and 1008 that were in direct mechanical contact with the displaced bundle 1005 prior to vacuum potting.

In addition, infiltration of the potting material 1009 between individual strands of the unserved bundles 1010 may also deform the braid, weave, or twist pattern of the unserved bundles 1010, resulting in misshapen, non-uniform bundles 1010 as shown in FIG. 10.

The distortion of the Litz strands within the non-uniform bundles 1010 and the displacement of the formerly uniform arrangement of Litz bundles 1005 locally increases proximity effect losses. Also, as neither the infiltrating potting material 1004 nor any trapped air (not shown) is nearly as thermally conductive as the copper strand itself, the distortion causes a sharp increase in thermal impedance to the outside of the cable 1001, thus creating "hot spots."

FIG. 11

Figure 11:
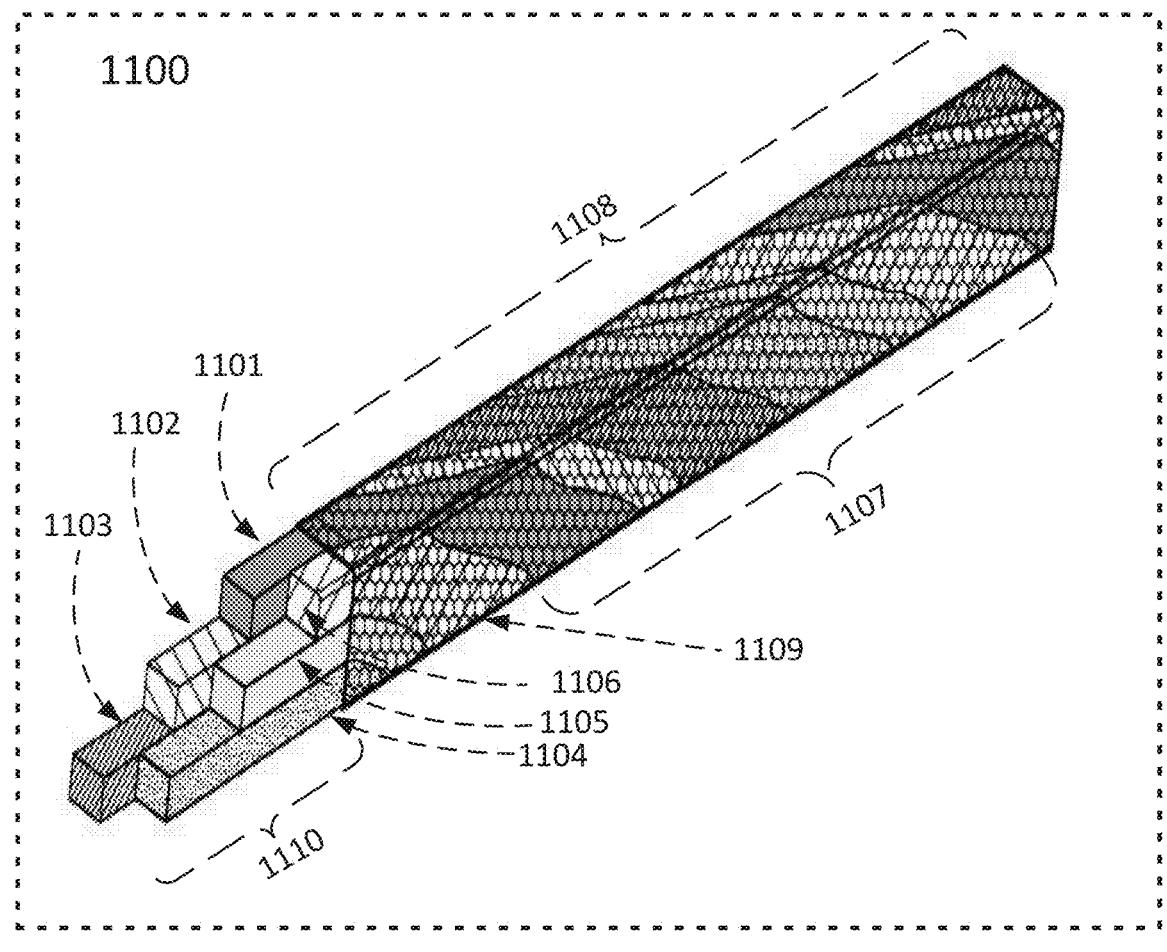
FIG. 11 is a diagram illustrating an anti-birdcaging Litz wire configuration for a WPT primary or secondary coil in a sample configuration.

FIG. 11 is a diagram illustrating an anti-birdcaging Litz wire configuration for a WPT primary or secondary coil in a sample configuration. FIG. 11 shows the details of the rectangular Litz cable 903 comprised of multiple (six in this example) Litz bundles 904 as described with respect to FIG. 9.

In the coil section 1100 shown in FIG. 11, each rectangular Litz bundle 1101, 1102, 1103, 1104, 1105, and 1106 includes a plurality of Litz wire sub-bundles (as in the example of FIG. 2B), each of which includes 7 insulated Litz wire strands formed by internally weaving, braiding, or twisting the 7 insulated Litz wire strands together and rolling/compressing the 7 insulated Litz wire strands into the rectangular shape of each sub-bundle. No outer insulation is added to the sub-bundles. Instead, the sub-bundles are internally woven, braided, or twisted together and then rolled/compressed into the rectangular shape of each bundle

1101, 1102, 1103, 1104, 1105, and 1106. Once again, no outer insulation is added to each bundle. Each of the rectangular Litz bundles 1101, 1102, 1103, 1104, 1105, and 1106, are then internally woven, braided, or twisted and then rolled/compressed to create a repeating, uniform pattern 1107 as shown in FIG. 11. The resulting coil section 1108 also is not insulated or served but is instead coated with a continuous thin (nominally 0.001 inches/25.4 microns or less) film coating 1109 such as polytetrafluoroethylene (PTFE) designed to withstand vacuum potting whereby the potting material and air are prevented from accessing the respective bundles 1101, 1102, 1103, 1104, 1105, and 1106 (and hence the component sub-bundles and individual strands) during the vacuum potting process. Since the film coating 1109 will remain in place throughout the service life of the coil, temperature range compatibility is desired. The coated coil section 1100 is fitted into the channel 902 of the coil tray 901 as shown in FIG. 9 prior to vacuum potting. An uncoated section 1110 is used to fan-out the separate bundles to electrical terminals which also serve to sink heat.

It will be appreciated by those skilled in the art that the proposed design maximizes the amount of conductive material in the channels, thus maximizing flux density. Also, since the potting material and air do not distend the Litz bundles and the braiding and twisting serve to create uniform magnetic flux at the surface of the coil 1100, the coil 1100 when used as a primary coil provides a uniform magnetic field while minimizing hot spots. Similarly, when the coil 1100 is used as a secondary coil, the uniformly braided, woven or twisted Litz strands and bundles receive the magnetic flux evenly while minimizing resistive heating.

Based on manufacturing and deployment options, the inductive coil 1100 can have differing constructions. In one construction, the coil 1100 is delivered on a cable spool and is cut to length. This construction necessitates the use of serving around the interior bundles 1101, 1102, 1103, 1104, 1105, and 1106 to preserve the integrity of each bundle after mechanical separation from the spool. Another technique that associates a strand to a bundle is by color coding (e.g., via pigmented lacquer common to each strand of a particular bundle). Color coding would allow differentiation of the strands for each bundle at either end of the cut length but would not preserve the mechanical structuring of the bundles.

In an another, pre-formed construction, the coil 1100 is manufactured to a pre-determined length with each bundle terminated in a solder tail or attachment terminal. No serving of bundles 1101, 1102, 1103, 1104, 1105, or 1106 or color-coding of strands denoting the bundle is necessary in this pre-formed construction.

CONCLUSION

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

Those skilled in the art will appreciate that while the disclosure contained herein pertains to coils for the provision of electrical power to vehicles, it should be understood that this is only one of many possible applications, and other embodiments including non-vehicular applications are possible. For example, those skilled in the art will appreciate that there are numerous applications where coils are used to provide charging to customer electronic devices or to provide heating. For example, inductive portable consumer electronic device chargers, such as those (e.g., PowerMat™) used to charge toothbrushes, cellular telephones, and other devices may include coils of the type described herein. Accordingly, these and other such applications are included within the scope of the following claims.

What is claimed:

1. An inductive coil comprising a plurality of uninsulated rectangular Litz wire bundles that are woven, braided, or twisted together and then rolled or compressed into a rectangular shape and coated with a non-insulating thin film coating, each Litz wire bundle comprising a plurality of uninsulated Litz wire sub-bundles that are woven, braided, or twisted together and then rolled or compressed into a rectangular shape, and each Litz wire sub-bundle including insulated Litz wire strands that are woven, braided, or twisted together and then rolled or compressed into a rectangular shape.

2. The coil of claim 1, wherein the Litz wire bundles are weaved, braided, or twisted together and then rolled or compressed to create a uniform pattern whereby each Litz wire bundle is substantially uniformly exposed to an outer surface of the coil.

3. The coil of claim 1, wherein the thin film coating is configured to withstand vacuum potting whereby potting material and air are prevented from accessing the Litz wire bundles during a vacuum potting process.

4. The coil of claim 1, wherein the plurality of uninsulated rectangular Litz wire bundles are shaped and sized to fit into a channel of a coil tray.

5. The coil of claim 4, wherein the plurality of uninsulated rectangular Litz wire bundles are served on a cable spool and cut to length.

6. The coil of claim 5, wherein each insulated Litz wire strand in a sub-bundle is color-coded to differentiate each insulated Litz wire strand at either end of a cut length of a Litz wire bundle.

7. The coil of claim 1, wherein the coil has a predetermined length and each Litz wire bundle is terminated in a solder tail or attachment terminal.

8. A coil assembly for a wireless power transfer (WPT) system, comprising:

a coil carrier tray constructed of a non-conductive, magnetically transparent material and having channels formed therein; and an inductive coil disposed in at least two of the channels, the coil comprising a plurality of uninsulated rectangular Litz wire bundles that are woven, braided, or twisted together and then rolled or compressed into a rectangular shape and coated with a non-insulating thin film coating, each Litz wire bundle comprising a plurality of uninsulated Litz wire sub-bundles that are woven, braided, or twisted together and then rolled or compressed into a rectangular shape, and each Litz wire sub-bundle including insulated Litz wire strands that are woven, braided, or twisted together and then rolled or compressed into a rectangular shape.

9. The coil assembly of claim 8, wherein the coil carrier tray is comprised of fiberglass or a ceramic.

10. The coil assembly of claim 8, wherein the coil carrier tray further comprises a lid and a center post that bears the weight of the lid and a vehicle, pedestrian, or other load on the coil carrier tray.

11. The coil assembly of claim 8, wherein the Litz wire bundles are woven, braided, or twisted together and then rolled or compressed to create a uniform pattern whereby each Litz wire bundle is substantially uniformly exposed to an outer surface of the coil.

12. The coil assembly of claim 8, wherein the thin film coating is configured to withstand vacuum potting whereby potting material and air are prevented from accessing the Litz wire bundles during a vacuum potting process.

13. The coil assembly of claim 8, wherein the plurality of uninsulated rectangular Litz wire bundles are shaped and sized to fit into a channel of the coil carrier tray.

14. The coil assembly of claim 8, wherein the plurality of uninsulated rectangular Litz wire bundles are served on a cable spool and cut to length.

15. A method of manufacturing an induction coil for a wireless power transfer (WPT) system, comprising:

weaving, braiding, or twisting together a plurality of insulated Litz wire strands into a plurality of uninsulated Litz wire sub-bundles and then rolling or compressing each Litz wire sub-bundle into respective rectangular shapes;

weaving, braiding, or twisting together each Litz wire sub-bundle into a plurality of uninsulated Litz wire bundles and then rolling or compressing each Litz wire bundle into respective rectangular shapes;

weaving, braiding, or twisting together each Litz wire bundle into a Litz wire cable and then rolling or compressing the Litz wire cable into a rectangular shape;

coating the Litz wire cable with a non-insulating thin film coating; and inserting the Litz wire cable into respective channels of a coil carrier tray constructed of a non-conductive, magnetically transparent material.

16. The method of claim 15, wherein weaving, braiding, or twisting together each Litz wire bundle into a Litz wire cable and then rolling or compressing the Litz wire cable into a rectangular shape comprises rolling or compressing the Litz wire cable into a rectangular shape having a uniform pattern whereby each Litz wire bundle is substantially uniformly exposed to an outer surface of the induction coil.

17. The method of claim 15, wherein coating the Litz wire cable with the thin film coating comprises coating the Litz wire with the thin film coating so as to withstand vacuum potting whereby potting material and air are prevented from accessing the Litz wire bundles during a vacuum potting process.

18. The method of claim 15, wherein inserting the Litz wire cable into respective channels of a coil carrier tray comprises adapting the Litz wire cable to substantially conform to a shape of a channel of the coil carrier tray.

19. The method of claim 15, further comprising color-coding each insulated Litz wire strand in a sub-bundle, serving the plurality of uninsulated rectangular Litz wire bundles on a cable spool, and cutting the uninsulated rectangular Litz wire bundles to length, wherein each insulated Litz wire strand in a sub-bundle is differentiated at either end of a cut length of a Litz wire bundle.

20. The method of claim 15, further comprising cutting the Litz wire cable to a predetermined length and terminating each Litz wire bundle in a solder tail or attachment terminal.

* * * * *